Oct. 13, 1970 W. BRUCH 3,534,151

MEANS FOR IMPROVING THE COLOR RENDITION IN A COLOR TELEVISION SYSTEM

Filed Oct. 13, 1966 2 Sheets-Sheet 1

INVENTOR
Walter Bruch
BY Spencer & Kaye
ATTORNEYS

Oct. 13, 1970 W. BRUCH 3,534,151

MEANS FOR IMPROVING THE COLOR RENDITION IN A COLOR TELEVISION SYSTEM

Filed Oct. 13, 1966 2 Sheets-Sheet 2

INVENTOR
Walter Bruch

BY Spencer & Kaye
ATTORNEYS 3,534,151

MEANS FOR IMPROVING THE COLOR RENDITION IN A PAL COLOR TELEVISION SYSTEM

Walter Bruch, Hannover, Germany, assignor to Telefunken Patentverwertungsgesellschaft m.b.H., Ulm (Danube), Germany Filed Oct. 13, 1966, Ser. No. 586,531
Claims priority, application Germany, Oct. 20, 1965, T 29,612
Int. Cl. H04n 9/38
U.S. Cl. 178—5.2 11 Claims

ABSTRACT OF THE DISCLOSURE

In a PAL color television system of the type in which the color information delivered to a receiver picture tube for producing each picture line is constituted by the average value of the originally derived color information associated with at least two successively transmitted picture lines, means for delaying the luminance signal of each picture line, with respect to its associated chrominance subcarrier, by an amount equal to one or two complete picture lines.

The present invention relates to a color television system, and particularly to an improved system of the type employing averaging of the color information associated with successive picture lines.

In a PAL (phase alternating line) color television system, a color subcarrier is modulated in accordance with the color information and is transmitted as a modulated chrominance subcarrier. If this subcarrier is considered as a vector, its modulation can be represented as a modulation of the vector with respect to two mutually perpendicular axis. In accordance with the principle of PAL systems, the modulation with respect to one axis is shifted by 180° from one picture line to the next.

The demodulation of this chrominance subcarrier at the receiver can be carried out in the manner described in Telefunken Zeitung (news bulletin), issue Jan. 2, 1963, at pages 81 to 83, by means of a delay circuit which imparts a time delay equal to one line scanning period (64 $\mu$s., approximately). According to this demodulation technique, the chrominance subcarriers of two successive picture lines are added together in a first addition step and are then subtracted in a subsequent subtraction step for the purpose of separating the mutually perpendicular components of the color information vector. Thus, this time delay demodulation causes color information to be derived from the information associated with every successive pair of picture lines. It should be understood that the reference herein to successive pairs of picture lines refers to the order in which picture lines are transmitted and impressed on the receiver screen, i.e., the successive lines of a single picture field and not the apparently successive lines of a complete picture frame.

This technique is based on the assumption that the color information contained in two successive picture lines is practically identical. Although this technique in fact produces a slight resolution loss in the vertical direction, this loss does not have any discernible effect on the resulting picture.

It has been suggested to effect an averaging of the signals associated with two successive picture lines for purposes of transcoding (see German Pat. No. 1,167,881), or for correcting the phase of the chrominance subcarrier (see Telefunken Zeitung 1964, issue 2, pages 103–105), for example. However, repeated averaging of the signals associated with successive pairs of picture lines, which may be carried out either at the transmitter, in the transmission path, or at the receiver, might introduce distortions into the resulting picture. This is true because after just two such averaging operations in succession, for example, the averaged color information signal of a given picture line will have information components originally associated with the line itself, as well as components originally associated with its two immediately preceding lines. In other words, the color information signal for the line is a composite for the color information signals originally associated with three successive lines. One result thereof is that the amplitude of the luminance signal is no longer optimally centered between the peaks of the chrominance signal. The resulting distortion will be visible on the picture screen in the form of color smudges at both ends of each picture line. These distortions are particularly serious when such an averaging is carried out at the transmitter, particularly since it is impossible to subsequently separate an averaged signal into its original component signals.

It is a primary object of the present invention to overcome or minimize these drawbacks.

A more specific object of the present invention is to reduce the effect of distortions of the above-described type.

Another object of the present invention is to process a color television signal so as to minimize the resulting color distortions.

These and other objects according to the present invention are achieved by the provision of a novel arrangement in a color television system including a transmitter, a transmission path, and at least one receiver. The system in which the present invention is employed is arranged to transmit picture information in the form of a luminance signal and a chrominance subcarrier constituted by a color subcarrier modulated by color information, the color information delivered to the receiver picture tube for producing each picture line being constituted by the average value of the originally derived color information associated with at least two successively transmitted picture lines. According to the present invention, there are provided means for delaying the luminance signal with respect to its associated chrominance subcarrier by an amount substantially equal to an integral multiple of one complete picture line period. The delay is preferably equal to one complete picture line period.

In accordance with an auxiliary feature of the present invention, the means for delaying the luminance signal can also be arranged to accomplish a vertical aperture correction of the type known per se in the art. For example, it could be employed to produce a vertical aperture correction in the manner disclosed in U.S. Pat. No. 2,957,042 issued on Oct. 18, 1960 to W. G. Gibson and A. C. Schroeder.

Additional objects and advantages of the present invention will become apparent upon consideration of the following description when taken in conjunction with the accompanying drawings in which:

FIGS. 1*a* to 1*f* are graphs used in explaining the present invention.

FIGS. 1*a* to 1*f* show signal amplitude vs. time waveforms for a luminance signal Y and its associated chrominance signal U. These waveforms represent the average value of the information component of its associated signal over each picture line, each graph extending over five picture lines of a single picture field. The luminance Y is shown as a solid line, while the chrominance signal U is indicated by a broken line.

Figure 1:
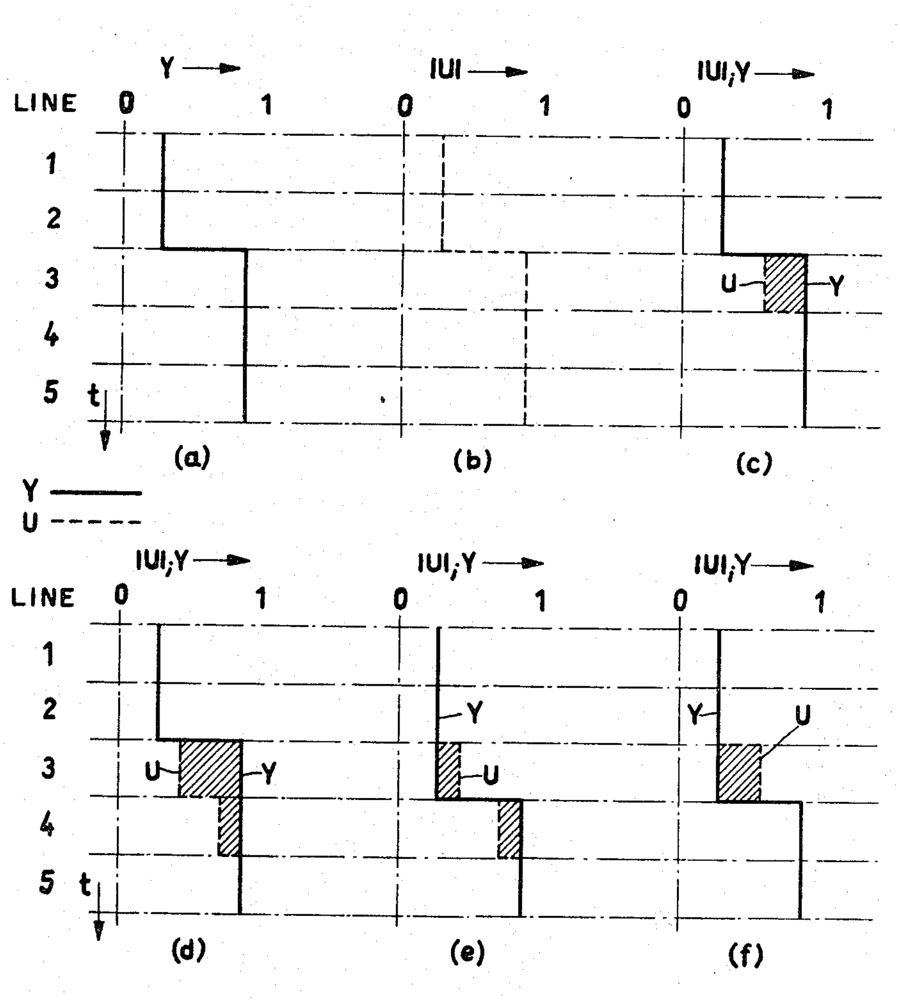

As is shown in FIG. 1*a*, the luminance signal Y has a relatively low value over the first two picture lines represented and then jumps to a value slightly below unity between the second and third picture lines. FIG. 1*b* shows the amplitude of the chrominance signal U and shows that this amplitude also has a low value over the first two picture lines and then jumps in synchronism with the signal Y to a value just below unity between the second and third picture lines. The value of chrominance signal U over the first two picture lines may be considered to correspond to the value required to produce a 100% saturated red color, while the value to which this signal jumps between the second and third picture lines can be considered to correspond to a 100% saturated yellow color. The signal represented in FIGS. 1*a* and1*b* may be processed in the receiver to produce a picture having the correct colors.

However, when the receiver is of the type employing time delay demodulation, the amplitudes of the chrominance signals associated with successive pairs of pictures lines will be averaged to yield a chrominance signal U of the type shown in FIG. 1*c*. As a result, signals Y and U will no longer coincide over the third picture line. However, the small resulting deviation, which is shown as a shaded area in FIG. 1*c*, will not produce any serious distortions in the picture.

Referring now to FIG. 1*d*, there is shown the situation which arises in a receiver which employs successive multiple averaging of the color information signals associated with successive picture lines, i.e., wherein the finally processed chrominance signal for each line represents the average of the received chrominance signal for that line and the received chrominance signals of the two immediately preceding lines.

Thus, in FIG. 1*d*, the processed chrominance signal associated with the third picture line is an average of the originally received chrominance signals associated with the first, second and third picture lines, while the processed chrominance signal for the fourth picture line is an average of the originally received chrominance signals associated with the second, third and fourth picture lines. Since the originally received chrominance signals for the third, fourth and fifth picture lines all have the same values, the processed chrominance signal associated with the fifth picture line will have the same value as the originally received chrominance signal associated with that line.

An averaging of the type shown in FIG. 1*d* could be produced, for example, by an adjustment circuit in the transmission path of the television signal and a time delay demodulator in the receiver.

As may be noted, the deviation between the processed chrominance signal and the luminance signal associated with the third picture line is greater when the signal is processed in the manner illustrated in FIG. 1*d* than when the signal is processed in the manner illustrated in FIG. 1*c*.

As a result of the great deviation between the processed chrominance and luminance signals associated with the third picture line in FIG. 1*d*, the color at the trailing edge of the second picture line will present a smudged appearance on the television screen.

According to the present invention, the undesirable distortion is minimized by an amount which renders it substantially undescernable by delaying the luminance signal Y by an amount equal to one picture scanning line period. The resulting relationship between the luminance signal Y and he chrominance signal U is shown in FIG. 1*e*. As can be seen from FIG. 1*e*, the deviations between the two signal components are substantially reduced, particularly over the third picture line. These deviations are indicated by the shaded areas.

FIG. 1*f* shows the resulting deviation when the luminance signal is delayed by one picture line scanning period and when he chrominance information signal is processed in the manner described above in connection with FIG. 1*c*. It may be seen that although no improvement is obtained in this case by delaying the luminance signal, neither is any undesirable result produced because the deviation between the luminance and chrominance sgnals is the same as in FIG. 1*c*, the only difference being that the polarity of the deviation is reversed.

The delay of the luminance signal according to the present invention can be acoomplished in the transmitter, in the transmission path from the transmitter, or in the receiver. However, it is preferable to effect the delay in the transmitter or in the transmission path in order to permit a single delay circuit to affect a large number of receivers.

Figure 2:
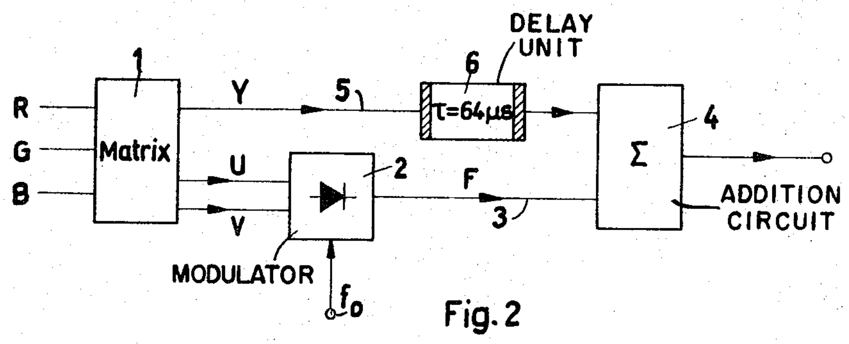
FIG. 2 is a block circuit diagram of a first embodiment of the present invention.

FIG. 2 is a block diagram of one embodiment according to the present invention for use in a color television transmitter. This circuit includes a matrix 1 which receives the red, green and blue signals (R, G, and B) from the television camera and which combines these signals in specific proportions so as to yield luminance signal Y and two color signals U and V. The symbols U and V may represent the signals I and Q or the signals R–Y and B–Y or the signals X and Z or any other pair of combined color signals.

The color signals U and V are fed to a modulator 2 which received a color subcarrier which has a frequency $f_0$ and which modulates this subcarrier by the U and V signals so as to produce an amplitude and phase modulated PAL chrominance subcarrier F. This subcarrier is transmitted via a line 3 to an addition circuit 4.

At the same time, the luminance signal Y is conveyed via a line 5 to a delay unit 6 where it is delayed by a time equal to one picture scanning line (approximately 64 $\mu$s.). The signal could also be delayed by a time equal to two or more picture lines. The delayed luminance signal is then fed to the addition circuit 4 where it is added to the chrominance subcarrier F. The combined signal may then be led to a modulator circuit for the purpose of modulating the video carrier.

It may be noted that in this embodiment the delay circuit 6 receives a signal at the original video signal frequency. Under these circumstances, the delay unit 6 is preferably constituted by a suitably dimensioned long delay line.

Figure 3:
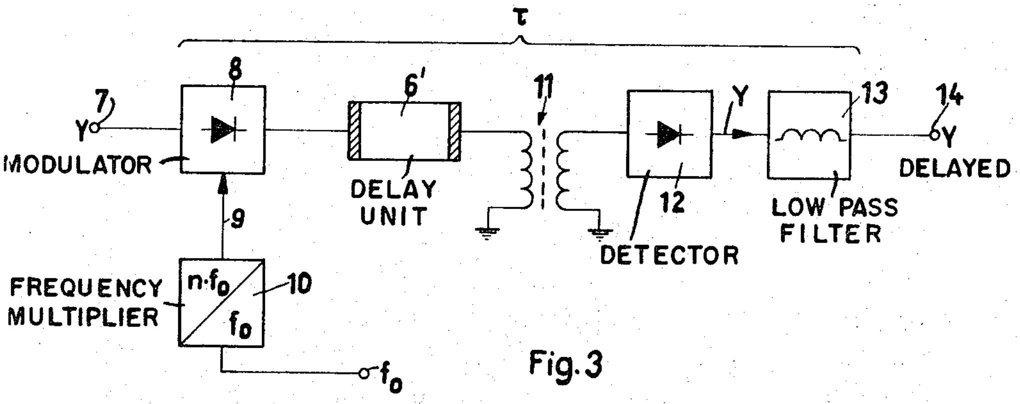
FIG. 3 is a block circuit diagram showing a second embodiment of the present invention.

Referring now to FIG. 3, there is shown an arrangement which can be used either by itself or as the Y signal processing portion of the embodiment of FIG. 2, and which constitutes another embodiment of the present invention. FIG. 3 shows only circuit elements for processing the Y signal. The luminance signal Y is supplied by a terminal 7, which may be connected to the output from matrix 1, for example, to a modulator 8. Also fed to the modulator 8, via line 9, is an auxiliary carrier signal having a frequency which is an integral multiple of the color subcarrier frequency $f_0$. The output from the multiplier 10 has a frequency equal to $n \cdot f_0$, where $n$ is preferably equal to two or three. The input to the frequency multiplier 10 is an unmodulated signal at the color subcarrier frequency $f_0$.

The maintenance of a fixed ratio between the auxiliary carrier frequency and the color carrier frequency is desirable because it minimizes the effects of any distortions which might result from residual components of the auxiliary carrier in the processed luminance signal.

Modulator 8 may be of the type which produces either an amplitude modulation or a frequency modulation and presents an output constituted by the auxiliary carrier modulated by the luminance signal. This modulated signal is then passed through a delay unit 6'. Because the signal applied to delay unit 6' is in the form of a modulated signal at the auxiliary carrier frequency, delay unit 6' can advantageously be constituted by an ultrasonic delay unit having a band width at least as large as that of the unmodulated luminance signal.

The output from delay unit 6' is fed via a transformer 11 to a detector 12 which eliminates substantially all of the auxiliary carrier frequency from the luminance signal.

The signal is then delivered to a low-pass filter 13 which filters out any residual component of the auxiliary carrier. The demodulated and delayed luminance signal Y is then fed to a terminal 14, from where it may be supplied to the additional circuit 4 of FIG. 2.

The total delay imparted by the elements 8, 6', 11, 12 and 13 is selected so as to be equal to one line scanning period (64 μs., approximately) or to several line scanning periods.

When the luminance signal is delayed according to the present invention, additional delays in the transmission path and in the receiver caused by other circuit elements, or delays which previously had to be purposely introduced because of the varying bandwidths of the luminance and chrominance signals, can be taken into consideration so as to permit the elimination of any additional delaying elements which previously had to be provided in the transmission path or in the receiver.

When it is intended to produce the delay according to the present invention in the television receiver, the delay circuit which is usually always present in a PAL receiver, and which imparts a delay equal to one line scanning period, can be arranged to additionally perform the function of delaying the luminance signal by one picture scanning line period with respect to the chrominance signal. This can be accomplished, for example, by applying the demodulated luminance signal to an auxiliary carrier whose frequency is substantially different from that of the color subcarrier in order to permit the thus modulated luminance signal to be separated from the color carrier itself by means of filters disposed at the output of the delay circuit. The delay according to the present invention can also be produced by using the delay circuit which is already present in a transcoder or a phase corrector provided for delaying the color carrier.

When the delay is effected at the receiver, a circuit of the type shown in FIG. 3 can be provided as a separate circuit unit and can be connected so as to employ one of the above-mentioned delay circuits as the delay unit 6'.

It will be understood that the above description of the present invention is susceptible to various modifications, changes, and adaptations.

What is claimed is:

1. In a color television system including a transmitter, a transmission path, and at least one receiver, wherein picture information is transmitted over a route in the form of a luminance signal and a chrominance subcarrier constituted by a color subcarrier modulated by two chrominance signals, the system further including means for causing the color information delivered to the receiver picture tube for producing each picture line to be constituted by the average value of the originally derived color information associated with at least two successively transmitted picture lines, the improvement comprising means connected in the picture information route of said system for delaying the luminance signal of each picture line, with respect to its associated chrominance subcarrier by an amount substantially equal to an integral multiple of one complete picture line period, said integral multiple being one or two.

2. An arrangement as defined in claim 1 wherein said means are disposed in the transmitter and connected in series in the luminance signal path thereof.

3. An arrangement as defined in claim 1 wherein said means are disposed in the transmission path and connected in series in the luminance signal path thereof.

4. An arrangement as defined in claim 1 wherein said means are disposed in each receiver and connected in series in the luminance signal path thereof.

5. An arrangement as defined in claim 1 wherein said means are connected to receive the luminance signal at its basic video frequency.

6. An arrangement as defined in claim 1 wherein said means comprise: a modulator connected to receive the luminance signal at its video frequency and to modulate this signal onto an auxiliary carrier; an ultrasonic delay circuit connected to the output of said modulator for delaying the modulated luminance signal; and a demodulator connected to the output of said delay circuit for eliminating the auxiliary carrier from the luminance signal.

7. An arrangement as defined in claim 6 wherein the frequency of the auxiliary carrier is a predetermined ratio of the frequency of the color subcarrier.

8. An arrangement as defined in claim 6 wherein the frequency of the auxiliary carrier is an integral multiple of the frequency of the color subcarrier.

9. An arrangement as defined in claim 1 wherein the delay imparted by said means is selected to compensate for delays produced in the luminance signal or chrominance subcarrier by other portions of the television system or due to the differing bandwidths of the luminance signal and the chrominance subcarrier.

10. An arrangement as defined in claim 1 wherein said means include a delay circuit provided for performing other functions.

11. An arrangement as defined in claim 1 wherein said means are additionally utilized for carrying out a known vertical aperture correction.

References Cited

UNITED STATES PATENTS

| | | | |
|---|---|---|---|
| 2,644,030 | 6/1953 | Moore | 178—5.2 |
| 2,971,053 | 2/1961 | Gibson | 178—7.2 |
| 2,989,581 | 6/1961 | Keizer et al. | 178—5.4 |
| 2,989,587 | 6/1961 | Bedford | 178—7.2 |
| 2,993,086 | 7/1961 | De France | 178—5.2 |
| 3,162,838 | 12/1964 | Sauvanet | 178—5.4 |
| 2,736,859 | 2/1956 | Pritchard et al. | |

RICHARD MURRAY, Primary Examiner

R. P. LANGE, Assistant Examiner

U.S. Cl. X.R.

178—5.4